(No Model.) 2 Sheets—Sheet 2.
C. E. BENTLEY.
VELOCIPEDE.
No. 399,003. Patented Mar. 5, 1889.
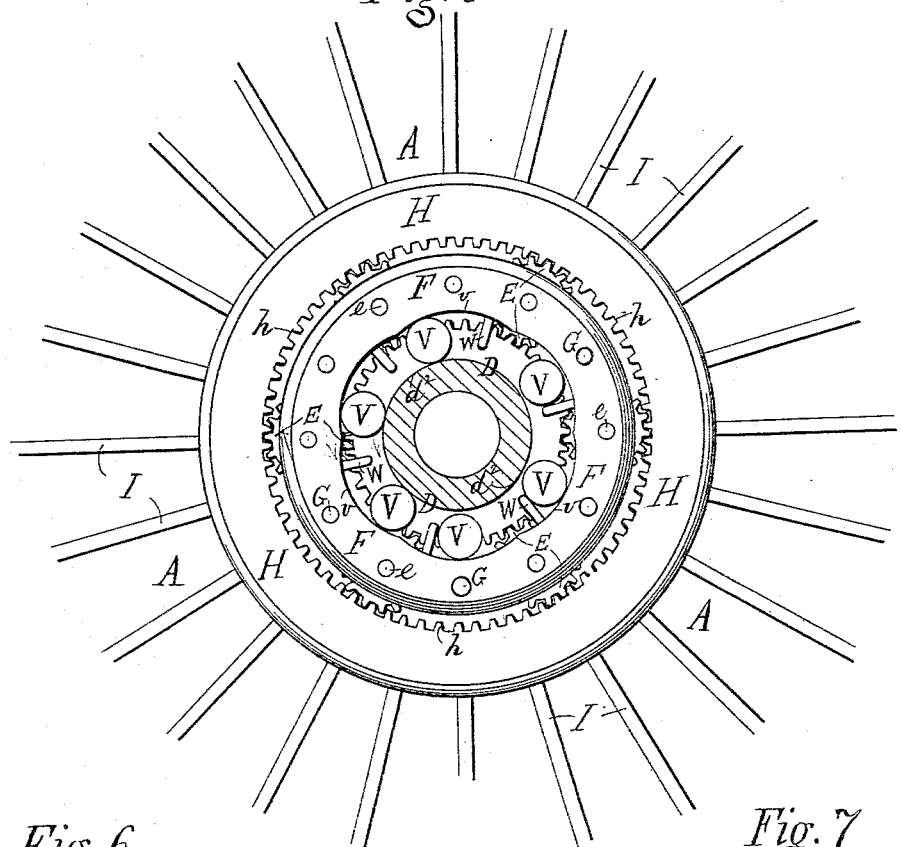
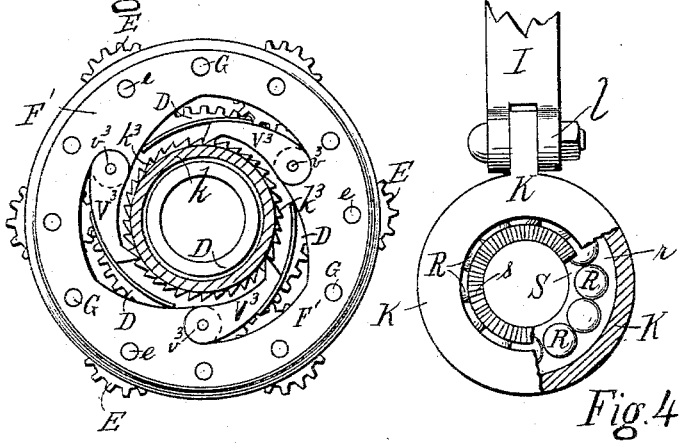
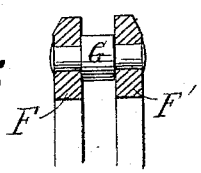
WITNESSES:
Frank Holland
J. C. Cougle
INVENTOR:
Chas. E. Bentley

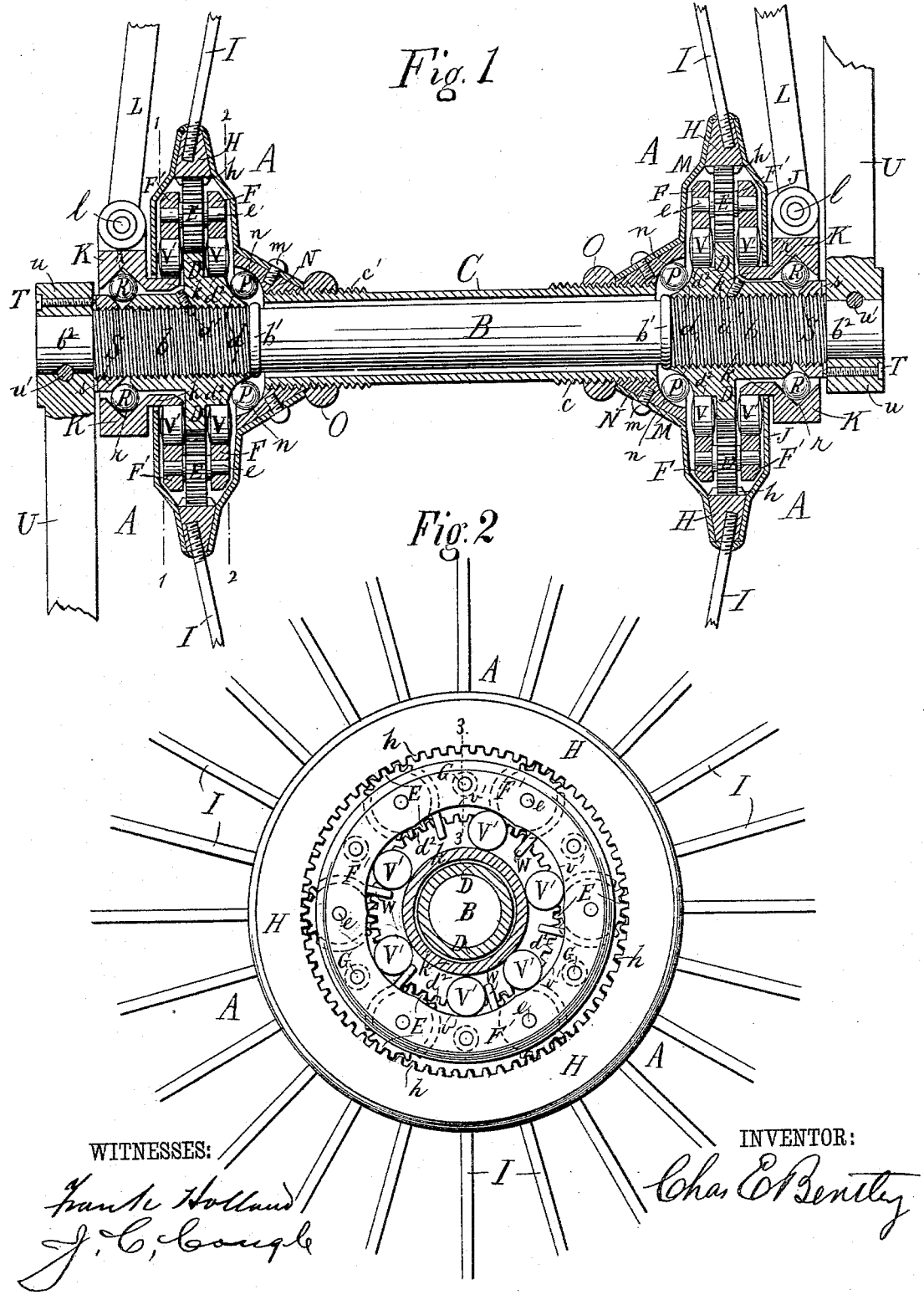

UNITED STATES PATENT OFFICE.

CHARLES E. BENTLEY, OF NEW YORK, N. Y.

VELOCIPEDE.

SPECIFICATION forming part of Letters Patent No. 399,003, dated March 5, 1889.

Application filed February 23, 1888. Serial No. 265,072. (No model.)

*To all whom it may concern:*

Be it known that I, CHARLES E. BENTLEY, of the city of New York, county and State of New York, have invented certain useful Improvements in Driving Mechanism for Velocipedes, of which the following is a full, clear, and exact description.

My invention has for its object to provide a simple, comparatively inexpensive, and efficient driving mechanism for bicycles, tricycles, or other velocipedes of this general class, which will enable the rider to apply his full power to propel the machine forward at high speed over level or comparatively level or smooth roads, and which will, by simply reversing the direction of rotation of the pedal-cranks, enable the rider to apply his full strength advantageously to drive the machine forward at a reduced speed when climbing hills or on rough roads, and will also allow the rider to hold the foot-pedals of the driving-cranks stationary and use them as foot-rests when the machine travels over downgrades of the road.

The invention consists in certain novel features of construction and combination of parts of the driving mechanism, all as hereinafter described and claimed.

Reference is to be had to the accompanying drawings, forming a part of this specification, and in which similar letters of reference indicate corresponding parts in the several views.

Figure 1 is a central vertical sectional elevation of the central portion or hub of the main or driving wheel of a bicycle with adjacent parts of the fork of the machine-frame and the driving-cranks, and constructed in accordance with my invention. Fig. 2 is an outside face view with a few parts in vertical section on the line 1 1 in Fig. 1. Fig. 3 is a reverse side view, partly in section, on the line 2 2, Fig. 1. Fig. 4 is an outside face view of the outer ball-bearing at one side of the hub and partly broken away, and with a portion of the fork-frame which is hinged to the bearing. Fig. 5 is a detail cross-section taken through the planet-gear ring-frame on the line 3 3 in Fig. 2; and Figs. 6 and 7 are face and cross-sectional views of a modified form of planet-gear clutch device, to be hereinafter described.

The drawings show only so much of the main driving-wheel of a bicycle as is necessary to illustrate my invention, which relates particularly to the construction of the driving-wheel hub and adjacent parts.

The hub of the bicycle driving-wheel consists, mainly, of two separate hubs, A A, made alike and fitted onto the opposite ends of the wheel-axle B and to a tube C, which surrounds the central portion of the axle; hence a detailed description of one of these hubs A and its connections to the axle B and tube C will quite suffice for a clear understanding of this part of my invention, and is as follows:

The axle B is shown screw-threaded externally near its outer end at $b$, and onto this threaded part $b$ is fitted the hub of a central spur gear-wheel, D, which is run onto the axle until it strikes a shoulder or collar, $b'$, thereon, and is then made fast by one or more screws or pins, $d'$, to compel its rotation with the axle; but the spur-gear D may be fastened to the axle in any approved way, so as to revolve with it. The teeth of the wheel D mesh into the teeth of a series of planet gears or pinions, E, which are journaled by their concentric shafts or axles $e$ in a frame consisting, preferably, of two hardened metal rings, F F', which are rigidly held to each other and at an even distance apart to properly receive the gears E by means of the studs or pins G, which have shoulders at the inner face of each ring and are riveted or upset at the outer faces of the rings. (See Figs. 5 and 7 of the drawings.) The planet-gears E or their shafts $e$ are also provided with shoulders, which, when the gears rotate, move on or against the inner faces of the rings F F' and prevent noisy or rasping contact of the sides of the gears with the rings, which otherwise might occur. Roller or pawl clutches operate between the inner edges of the rings F F' and the gear D and a relatively-fixed support, as hereinafter fully explained. The planet-gears E also mesh with an internal gear or toothed rack, $h$, formed on a metal ring, H, into which the spokes I of the driving-wheel are fitted in any approved way. To the outer face of this ring H is fixed a light metal plate or dust-guard, J, which is open at the center to receive the inner portion, $k$, of the outer ball-bearing collar, K, to which the adjacent side branch, L, of the bicycle fork or frame is hinged at $l$, and to the inner face of the ring H is fixed a somewhat heavier metal plate, M, which forms an inner dust-guard to the hub-clutch mechanism, and to which plate at the inside is fixed by screws $m$, or otherwise, a hardened metal collar, N, which is fitted to threads $c$ on the adjacent end of the tube C, which surrounds the shaft or axle B. On the same threads, $c$, is fitted a jam-nut, O, to hold the collar N securely on the tube in its proper position.

Inner ball-bearings, P, are fitted between hardened concave surfaces $d\, n$ on the hub of the central spur gear-wheel, D, and in the collar N, respectively, and as the screw-threads $c\, c$ at opposite ends of the tube C are right and left handed, and the collars N and the jam-nuts O of the opposite hubs A A are fitted to these right and left hand threads, it is obvious that wear of the inner ball-bearings, P P, of both the hubs A A may be conveniently and simultaneously taken up by simply turning the tube C and then tightening the jam-nuts O.

Outer ball-bearings, R, are fitted in a V-shaped annular groove, $r$, made in the fork-bearing collar K and in an opposing V-shaped groove formed between the beveled outer end of the hub of the spur-gear D and the beveled inner end of a collar, S, which is screwed onto the threaded part $b$ of the axle B. The outer end or face of the collar S is provided with a series of fine radial notches, $s$, into any one of which the point of a hardened set-screw, T, set into the hub $u$ of the adjacent pedal-crank U, may enter. The crank U is fitted onto the reduced extremity $b^2$ of the axle B, to which it is held, preferably, by a transversely-ranging pin or key, $u'$. The cranks U U, at opposite ends of the axle B, are set in reverse directions in the usual manner. It is obvious that by turning back the screw T until it clears the notches $s$ of the collar S said collar may then be turned inward on the threaded part $b$ of the axle to take up the wear at the ball-bearings R, and the screw T will then be set inward into another one of the face-notches $s$ of the collar S to lock the collar firmly in place.

Between the inner edge of the ring F and the concentric shoulder or face $d^2$ on the hub of the central gear-wheel, D, in Figs. 1 and 3 of the drawings there are placed loosely a series of hardened-steel clutch-rollers, V, and between the inner edge of the ring F' and the annular outer face of the hub $k$ of the outer ball-bearing collar, K, in said Figs. 1 and 3 are placed a like series of hardened-steel clutch-rollers, V'.

The inner edges of the rings F F' next the rollers V V', respectively, are provided with a series of depressions, $v\, v'$, which are preferably arcs of circles struck from centers distant about three-eighths of an inch from the center of the axle B, and in the edges of the rings F F' are fixed a series of pins W W', respectively, to serve as stops to the clutch-rollers in one direction and allow them to act only in the other direction—that is to say, the pins W in the rings F prevent clutching action of the rollers V between the curved faces $v$ of the ring F and the shoulder $d^2$ of the gear-wheel D as the pedal-cranks are turned backward, but allow these rollers V to bind or wedge tightly between the surfaces $v\, d^2$ as the pedal-cranks, and consequently the gear-wheel D, are turned forward, and the pins W' in the ring F' prevent clutching action of the rollers V' between the curved faces of the ring F' and the flange $k$ of the outer ball-bearing case, K, as the pedal-cranks are turned forward, but allow these rollers V' to bind or wedge tightly between the faces $v'$ and the flange $k$ as the pedal-cranks are turned backward, and neither the rollers V nor V' will have clutching action while the pedals are held stationary by the rider as the bicycle runs downhill.

I am not limited to any special form of clutch device or devices arranged between the spur-gear D and the ring F of the planet-gear frame, and between the ring F' of said frame and a relatively-fixed surface or support, which in this instance is the collar $k$ of the outside ball-bearing, K, fixed to the fork of the bicycle. As an instance of another form of clutch device, I represent in Figs. 6 and 7 of the drawings two series of pawl-clutches, $V^2\, V^3$, which are pivoted at $v^2\, v^3$, respectively, to the planet-gear rings F F', respectively, and are normally held by springs into engagement with ratchets $d^3\, k^3$, formed, respectively, on the spur-gear D and the collar $k^2$ of the outer ball-bearing, K. The pawl-clutches $V^2$ bind the spur-gear D and lock the planet-gear frame and gears at rest as the pedal-cranks are turned forward, and the pawl-clutches $V^3$ bind on the relatively-fixed surface or support $k$ and lock the planet-gear frame at rest, while allowing free rotation of the planet-gears by the spur-gear D, as the pedal-cranks are turned backward, and in substantially the same manner as the roller-clutches above described.

The operation of the velocipede-driving mechanism fitted with the roller-clutches is as follows: As the rider turns the pedal-cranks forward in the usual manner, the clutch-rollers V' will be inoperative and the other clutch-rollers, V, will act on the ring F and bind the entire ring-frames F F' and their planet-gears E and hub-gears H $h$ together, and the whole driving mechanism will be carried around forward as one piece with the wheel and axle, and this will be the mode of propulsion at full speed on comparatively smooth and level roads; but should an upgrade or rough road be reached the rider will simply reverse the direction of the pedal-cranks or turn them backward. This change of motion instantly releases or throws out of action the clutch-rollers V, while allowing the driving-wheel to run forward, and at once throws the other series of clutch-rollers, V', into action, causing them to bind between the rings F' and the flanges k of the ball-bearing collars K, and as these collars are fixed to the machine fork or frame the ring-frames F F' and the planet-gears E cannot have bodily rotation around the axle or its gears D, and as these gears D now turn backward with the axle it is manifest that the planet-gears E will be independently and simultaneously rotated forward by the gears D, and will, by meshing with the teeth h of the hub-rings H, continue the forward revolution of the driving-wheel, but at a slower speed, due to the different diameter of the gears D h. Should a downgrade be reached the rider will simply hold the pedal-cranks stationary, and the driving-wheel will run downhill freely of itself, as neither of the clutch-rollers V V' are operative, and the ring-frames F F' and their planet-gears E move forward with the driving-wheel and rotate as they move around the hub-gears D, which are held stationary by the cranks.

The operation of the pawl-clutches $V^2$ $V^3$ will be readily understood from the aforesaid description by simply stating that when the pedal-cranks are turned forward the pawls $V^2$ engage the spur-gears D and lock them and the planet-gear frame together to give quick forward movement to the bicycle, the pawls $V^3$ meanwhile slipping over the teeth of their ratchet $k^3$, and when the pedal-cranks are turned backward the pawls $V^2$ slip over their ratchet $d^3$ and leave the spur-gear D free to rotate backward, while the pawls $V^3$ engage the relatively-fixed surface or rack $k^3$ and lock the planet-gear frame at rest, while allowing the backwardly-rotating gear D to rotate the planet-gears and continue the forward rotation of the driving-wheel, but at a slower speed, and when both pedal-cranks are held steady as foot-rests for the rider neither of the pawl-clutches $V^2$ $V^3$ are operative and the bicycle will run freely forward on a downgrade of the road. As the pedal-cranks are turned forward, the drive-wheel runs forward on the ball-bearings R. As the cranks are turned backward, the drive-wheel runs forward on the ball-bearings P, and the wheel also runs on the bearings P when the cranks are held stationary for use as foot-rests.

I wish it to be understood that I am not limited to the flange or collar k of the ball-bearing K, as a relatively-fixed surface or support against which the planet-gear-frame clutch may act to lock the frame while allowing rotation of its gears, as above described, as with other construction of the parts it may be preferable and necessary to have the planet-gear-frame clutch device act directly on the fork or main frame of the machine. Furthermore, I am at liberty to use friction-gearing instead of toothed gearing if at any time I prefer the former construction, and the number of gears in the planet-gear frames and clutches used with them and the spur-gears on the axle may vary within the scope of my invention.

Having thus described my invention, I claim as new and desire to secure by Letters Patent—

1. The combination, in a velocipede, and with its drive-wheel axle, of a spur-gear rotating with the axle, an internal gear fast to the drive-wheel, a frame or support placed between said spur-gear and internal gear and carrying planet-gears meshing with said spur-gear and said internal gear, and a clutch device acting between the planet-gear frame and a relatively-stationary surface or support, substantially as described, for the purposes set forth.

2. The combination, in a velocipede, and with its drive-wheel axle, of a spur-gear rotating with the axle, an internal gear fast on the drive-wheel, a frame or support placed between said spur-gear and internal gear and carrying planet-gears meshing with said spur and internal gears, and two clutch devices or series of clutch devices, one clutch or series of clutches operating between the planet-gear frame and the spur-gear or a collar on the axle, and the other clutch or series of clutches acting between the planet-gear frame and a relatively-stationary surface or support, substantially as described, for the purposes set forth.

3. The combination, in a velocipede, and with its drive-wheel axle, of a spur-gear fixed to each end of the axle, two internal gears forming opposite side hubs or supports to the drive-wheel spokes, a planet-gear frame, and gears placed between the spur-gear and internal gear of each side hub, and two clutch devices at each side, one clutch device operating between the planet-gear frame and the spur-gear or a collar on the axle, and the other clutch device acting between the planet-gear frame and a relatively-stationary surface or support, substantially as described, for the purposes set forth.

4. The combination, in a velocipede, and with its drive-wheel axle, of a spur-gear, D, rotating with the axle, a collar or shoulder, $d^2$, also rotating with the axle, an internal gear, H, held to the driving-wheel spokes or body, a ring-frame, F F', carrying planet-gears E, meshing with the gears D H, a relatively-fixed collar or flange, as k, connected to the machine-frame, a clutch device operating between the frame-ring F and the shoulder $d^2$, and a clutch device operating between the frame-ring F' and the collar or flange k, substantially as described, for the purposes set forth.

5. The combination, in a velocipede, and with its drive-axle, of a spur-gear, D, rotating with the axle, a collar or shoulder, $d^2$, also rotating with the axle, an internal gear, H, held to the drive-wheel spokes or to the body of the wheel, a ring-frame, F F', carrying planet-gears E, meshing with the gears D H, a collar, K, connected to the fork-frame and supported on a ball-bearing from the axle, and provided with a flange, $k$, a clutch device operating between the ring F and shoulder $d^2$, and a clutch device acting between the ring F' and the flange $k$, substantially as described, for the purposes set forth.

6. The combination, in a velocipede, and with its drive-wheel axle, of a spur-gear, D, rotating with the axle, a collar or shoulder, $d^2$, also rotating with the axle, an internal gear, H, held to the drive-wheel spokes or to the body of the wheel, a ring-frame, F F', carrying planet-gears E, meshing with the gears D H, a relatively-fixed collar or flange, as $k$, connected with the machine-frame, a clutch device operating between the ring F and the shoulder $d^2$, a clutch device operating between the ring F' and the collar $k$, and dust-guard plates fitted to the drive-wheel at opposite faces of the planet-gear frame and covering the gearing and clutches, substantially as herein set forth.

7. The combination, in a velocipede, and with its drive-wheel axle, of a tube or sleeve, C, next the axle, and mechanism fitted at each end of the axle, as follows: a spur-gear, D, rotating with the axle, a collar or shoulder, $d^2$, also rotating with the axle, an internal gear, H, forming a hub or half-hub to the drive-wheel spokes, a ring-frame, F F', carrying planet-gears E, meshing with the gears D H, a collar, K, supported on a ball-bearing from the axle and connected to the fork-frame, and provided with a flange, $k$, a clutch device operating between the ring F and the shoulder $d^2$, and a clutch device operating between the ring F' and the flange $k$, an outer dust-guard plate, J, held to the gear H and surrounding the flange $k$, an inner dust-guard, M, held to the gear H, a hardened metal collar fixed to and with the plate M, and a circle of balls placed between said collar and an opposing surface on the axle for an inner ball-bearing, all arranged for operation substantially as described, for the purposes set forth.

8. The combination, in a velocipede, of an axle having near its ends hardened metal collars fast to said axle, a tube loosely surrounding said axle and having at its ends hardened metal collars fitted to said tube at one end by a right-handed and at the other by a left-handed thread, and the collars on the tube forming the inner and the collars on the axle the outer surfaces of ball-bearings, the adjustment of which is made by the revolution of said tube.

CHAS. E. BENTLEY.

Witnesses:
FRANK HOLLAND,
J. C. COUGLE.